United States Patent
Yiflach

(10) Patent No.: US 9,439,364 B2
(45) Date of Patent: Sep. 13, 2016

(54) APPARATUS AND METHOD FOR PRODUCING AN IRRIGATION PIPE

(75) Inventor: Erez Yiflach, Moshav Merchavia (IL)

(73) Assignee: YIFLACH, Erez, Moshav Merchavia (IL)

(*) Notice: Subject to any disclaimer, the term of this patent is extended or adjusted under 35 U.S.C. 154(b) by 132 days.

(21) Appl. No.: 13/380,931

(22) PCT Filed: Jul. 25, 2010

(86) PCT No.: PCT/IL2010/000591
§ 371 (c)(1),
(2), (4) Date: Dec. 27, 2011

(87) PCT Pub. No.: WO2011/013119
PCT Pub. Date: Feb. 3, 2011

(65) Prior Publication Data
US 2012/0104648 A1    May 3, 2012

(30) Foreign Application Priority Data
Jul. 29, 2009   (IL) .......................... 200148

(51) Int. Cl.
*B29C 47/00* (2006.01)
*A01G 25/02* (2006.01)

(52) U.S. Cl.
CPC ..................... *A01G 25/02* (2013.01)

(58) Field of Classification Search
USPC .................... 264/209.3, 210.1; 425/335
See application file for complete search history.

(56) References Cited

U.S. PATENT DOCUMENTS

| | | | |
|---|---|---|---|
| 2,054,115 A | 9/1936 | Abrams et al. | |
| 2,631,954 A | 3/1953 | Bright | |
| 2,879,547 A | 3/1959 | Morris | |
| 3,007,207 A | 11/1961 | Salhofer | |
| 3,165,505 A | 1/1965 | Ludwigshafen | |
| 3,184,526 A | 5/1965 | Klug | |
| 3,328,503 A | 6/1967 | Ancker | |
| 3,362,106 A | 1/1968 | Goldring | |
| 4,095,084 A | 6/1978 | Shutt | |
| 5,375,770 A | 12/1994 | Roberts | |
| 5,525,287 A * | 6/1996 | Van Erden et al. | 264/476 |
| 5,785,785 A | 7/1998 | Delmer et al. | |
| 6,159,412 A | 12/2000 | Fletcher et al. | |
| 6,302,445 B1 | 10/2001 | Kugele et al. | |
| 2009/0029114 A1 | 1/2009 | Cancio et al. | |

FOREIGN PATENT DOCUMENTS

| | | |
|---|---|---|
| CN | 1133774 | 10/1996 |
| CN | 1411965 | 4/2003 |
| GB | 1581686 | 12/1980 |

OTHER PUBLICATIONS

International Search Report for PCT Application No. PCT/IL2010/000591 mailed Oct. 29, 2010.
Chinese Office action for applicatin No. 201080033005.4, mailed on Dec. 4, 2013.

* cited by examiner

*Primary Examiner* — Christina Johnson
*Assistant Examiner* — Xue Liu
(74) *Attorney, Agent, or Firm* — Pearl Cohen Zedek Latzer Baratz LLP

(57) ABSTRACT

An apparatus enables forming extruded plastic material into a strip that may be formed into an irrigation pipe. The apparatus includes a pair of juxtaposed rollers which when rotated, the linear velocity of a contact surface of one of the rollers of the pair is different from the linear velocity of a contact surface of the other roller of the pair. Thus, extruded material that passes between the rollers is concurrently stretched and flattened.

8 Claims, 9 Drawing Sheets

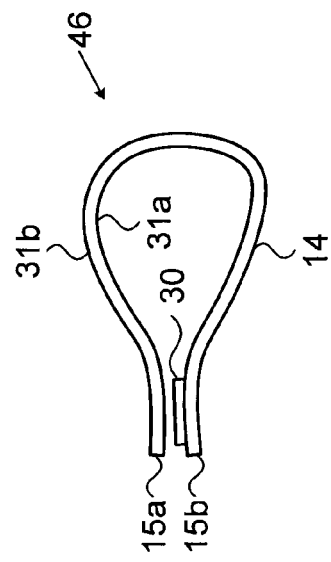
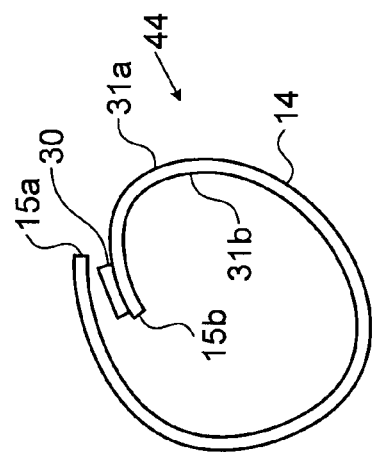
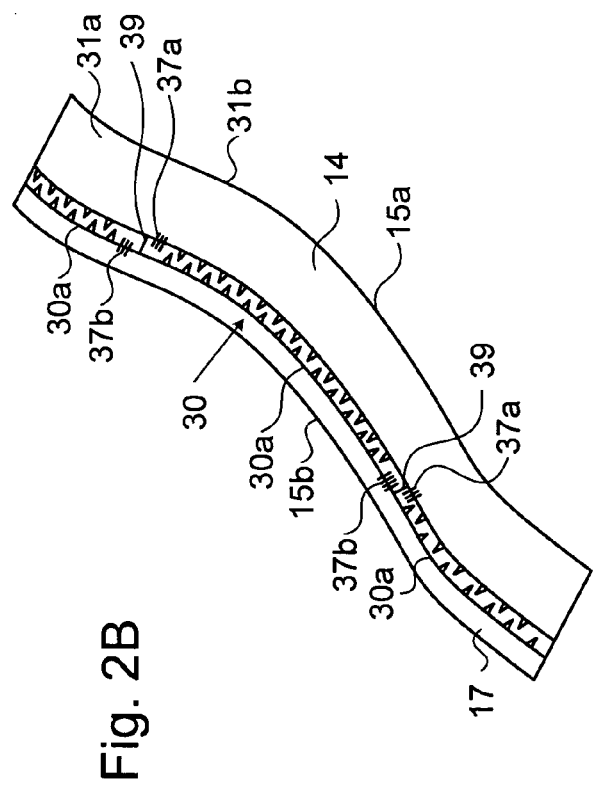

APPARATUS AND METHOD FOR PRODUCING AN IRRIGATION PIPE

CROSS-REFERENCE TO RELATED APPLICATIONS

This application is a National Phase Application of PCT International Application No. PCT/IL2010/000591, International Filing Date Jul. 25, 2010, claiming priority of Israel Patent Application Number 200148, filed Jul. 29, 2009.

FIELD OF THE INVENTION

The present invention relates to plastic forming. More particularly, the present invention relates to an apparatus and method for forming extruded plastic material into a strip, which are useful in various applications, such as, for example in the production of irrigation pipes.

BACKGROUND OF THE INVENTION

Plastic drip hoses and drip tapes are widely used for irrigation. A drip hose or drip tape includes a hose and incorporates drip irrigation emitters. Water fed to the hose at line pressure is emitted by the emitters as a series of individual drops. Often, a number of drip hoses may be connected to and fed by a single distribution pipe with attachment ports or nipples.

Emitters may be built into a plastic irrigation hose at the time of manufacture, or may be inserted by a user. Typically, a hose is produced by means of an extrusion process by an extruder. The extruder may be provided with a die that produces a hose in its final shape. Alternatively, the extrusion process may produce an approximately flat strip or sheet. A flat sheet may be cut into individual strips. Typically, the process used to form the flat sheet may include a process, such as, for example, layering or blowing, to increase the mechanical strength of the sheet. On the other hand, a strip that is extruded directly by an extruder may not have sufficient mechanical strength to enable use for irrigation of a hose made from the strip.

A flat strip may be shaped into a hose. Typically, shaping into a hose includes bending the strip about its longitudinal axis into the shape of a hose with the desired cross section, typically circular. The edges of the strip may be welded together, or otherwise caused to adhere to one another, at a seam where the edges meet. If necessary, excess strip material may be trimmed prior to shaping into the hose.

In general, when an emitter is built into an irrigation hose at the time of manufacture, the emitter body, or a set of parts to be assembled into an emitter, is manufactured separately from the hose. The separate emitter body may then be assembled or attached, or otherwise incorporated into, the hose or a strip of hose material prior to shaping the strip into a hose. On the other hand, an emitter body formed integral to the extruded material may yield an emitter that becomes distorted during cooling or during the hose formation process. In addition, an irrigation hose thus formed may not have sufficient mechanical strength for use under typical conditions.

It is an object of the present invention to provide a single apparatus and method for continuous production of a hose with a drip irrigation emitter, with the emitter being formed from the hose material in a single production process.

Other aims and advantages of the present invention will become apparent after reading the present invention and reviewing the accompanying drawings.

SUMMARY OF THE INVENTION

There is thus provided, in accordance with some embodiments of the present invention, an apparatus for forming extruded plastic material into a strip that may be formed into an irrigation pipe, the apparatus comprising a pair of juxtaposed rollers which when rotated, the linear velocity of a contact surface of one of the rollers of the pair of rollers is different from the linear velocity of a contact surface of the other roller of the pair of rollers such that extruded material that passes between the rollers is concurrently stretched and flattened.

Furthermore, in accordance with some embodiments of the present invention, the pair of juxtaposed rollers comprises a pair of cooled juxtaposed rollers.

Furthermore, in accordance with some embodiments of the present invention, a roller of the pair of rollers comprises a mold for impressing a pattern on the extruded material as the extruded material is flattened.

Furthermore, in accordance with some embodiments of the present invention, the pattern is selected from a group of patterns consisting of: a continuous row of drip irrigation emitter labyrinths, a row of one or more discrete drip irrigation emitter labyrinths, a crosshatch pattern, a pattern of polygons, a label, a stripe of different thickness, and a seed compartment.

Furthermore, in accordance with some embodiments of the present invention, the linear velocity of at least one of the rollers is adjustable.

Furthermore, in accordance with some embodiments of the present invention, the apparatus includes a belt for holding the flattened material against a roller of the pair of rollers as the roller rotates.

Furthermore, in accordance with some embodiments of the present invention, the apparatus includes a heated press for pressing into the strip so as to form a projection that protrudes from the strip.

Furthermore, in accordance with some embodiments of the present invention, the apparatus includes a shaping device.

There is further provided, in accordance with some embodiments of the present invention, a method for forming extruded plastic material into a strip that may be formed into an irrigation pipe. The method includes:

providing a pair of juxtaposed rollers; and passing the extruded plastic material between the pair of juxtaposed rollers, while maintaining the linear velocity of a contact surface of one of the rollers of the pair of rollers different from the linear velocity of a contact surface of the other roller of the pair of rollers, such that extruded material that passes between the rollers is concurrently stretched and flattened.

Furthermore, in accordance with some embodiments of the present invention, the method includes cooling the extruded material while it is being stretched and flattened.

Furthermore, in accordance with some embodiments of the present invention, the method includes adjusting the linear velocity of at least one of the rollers.

Furthermore, in accordance with some embodiments of the present invention, the method includes impressing a pattern on the extruded material as the extruded material is flattened.

Furthermore, in accordance with some embodiments of the present invention, the method includes holding the flattened material against a roller of the pair of rollers as the roller rotates using a belt.

Furthermore, in accordance with some embodiments of the present invention, the method includes pressing into the strip so as to form a projection that protrudes from the strip.

Furthermore, in accordance with some embodiments of the present invention, the method includes shaping the strip into a hose.

Furthermore, in accordance with some embodiments of the present invention, the method includes inserting tubes perpendicularly while shaping the strip into a hose, so as to form a distribution pipe.

Furthermore, in accordance with some embodiments of the present invention, the method includes providing the tubes with wings Furthermore, in accordance with some embodiments of the present invention, the method includes inserting a seed while shaping the strip into a hose.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 2B shows a strip formed by the roller shown in FIG. 2A.

FIG. 2C shows a cross section of a drip irrigation hose formed by bending the strip of FIG. 2B.

FIG. 2D shows a cross section of an alternative configuration of a drip irrigation hose formed from the strip shown in FIG. 2B.

DETAILED DESCRIPTION OF EMBODIMENTS

Figure 1A:
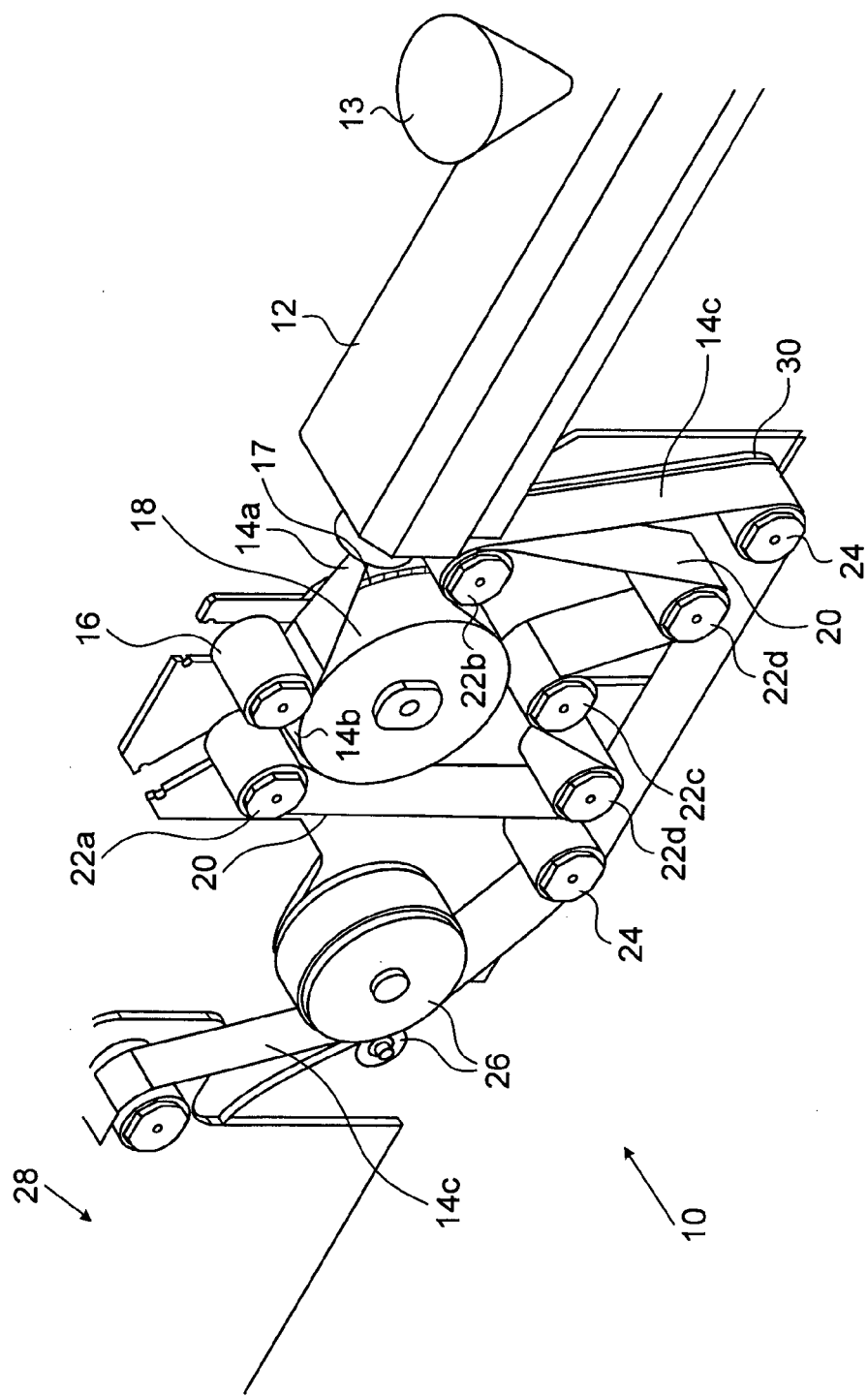
FIG. 1A shows an apparatus for producing an irrigation pipe, in accordance with embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

An apparatus for producing an irrigation pipe, such as a drip irrigation hose or a distribution pipe, in accordance with embodiments of the present invention includes an extruder for extruding a plastic material for a irrigation pipe, a stretching component for stretching the extruded material as the material is cooled, a set of rollers for shaping the extruded material into a flat strip for impressing a labyrinth for a drip irrigation emitter onto the strip, and a forming device for forming the extruded material into a hose.

The extruder processes a raw material and extrudes a plastic material, for example, polyethylene, from which a pipe may be formed. The extruded material is shaped by a die of the extruder into a form suitable for processing into an irrigation pipe. Typically, for example, the material may be extruded in the form of a continuous cylindrical pencil of warm plastic material. Alternatively, the material may be extruded in the form of a flattened ribbon of material, or any other suitable form. One or more stripes, ribbons, or pencils of one or more other materials may be coextruded with the pipe material. For example, the coextruded material may have a color different from that of the pipe material. Alternatively, a coextruded material may provide material for a material layer for providing protection against ultraviolet radiation or other environmental factors, or for providing additional reinforcement or mechanical strength.

Prior to cooling, the extruded material may be formed into a desired shape. For formation of an irrigation pipe, a typical desired shape may include, for example, a strip of material on which one or more patterns may be impressed. Typical impressed patterns may include, for example, components of an integrated drip irrigation emitter, patterns of raised structural elements, labeling, longitudinal bands of differing thickness, or protruding ports for attachment of other pipes. When the material cools and hardens, the impressed patterns may be retained on the strip.

An apparatus in accordance with embodiments of the present invention includes an element for stretching the extruded material while cooling it. Typically, the material is stretched by a system of rollers that also flatten the material. Typically, each roller of the system of rollers is rotated by means of a motor and a transmission. The rotation angular velocity of one or more of the rollers may be adjustable through a manual or automatic control. Typically, the system of rollers includes a pair of cooled rollers between which a continuous pencil of extruded material is flattened into a strip of material. Typically, one roller of the pair of cooled rollers is a mold roller. A mold roller typically includes a metal surface engraved with one or more molds for impressing forms onto a surface of the flattened strip. A second press roller presses the extruded material against the mold roller, both flattening the material into a strip and causing a mold on the mold roller to impress a form onto the strip. Alternatively, the press roller may also include a mold for impressing a form onto the strip.

One or both of rollers of the pair of cooled rollers may be actively cooled. For example, a coolant fluid may be caused to flow through the interior roller. Alternatively, a roller may be actively cooled by thermoelectric cooling, by convective cooling of the exterior of the roller, or any other cooling method known in the art.

Typically, stretching the material may be accomplished by causing the material on opposite sides of an extruded pencil to move with different velocities while being cooled, either prior to or during flattening. Typically, the velocity difference is introduced as the material is being flattened by a pair of juxtaposed rollers into a strip of material. The velocity of a surface of material that is in contact with a roller may be determined by the linear velocity of the part of the roller surface (hereinafter referred as a "contact surface") with which it is in contact. The linear velocity of a point on the contact surface of the roller may be adjusted by adjusting the angular rotation velocity of the roller. Typically, the rotation velocity of one or more rollers is adjusted such that the linear velocity of the contact surface of a roller on one side of the extruded material being flattened is different from the linear velocity of the contact surface of a roller on the opposite side of the material. The difference in linear velocities of the contact surfaces causes the extruded material to stretch as it is being flattened.

Stretching the extruded material in the strip in the manner described above while cooling the material may increase the mechanical strength of the material. Therefore it is advantageous to use cooled rollers (maintaining them at a cool temperature that effectively cools the extruded material passing in between the rollers) or otherwise cool the material as it is being flattened.

For example, stretching the material while it is being cooled may increase cross-linking between molecules of a polymer material. For example, increasing the mechanical strength of a material may increase the resistance of the strip to puncturing, tearing, stretching, or splitting. Typically, the rotational velocity of one or both rollers may be adjusted until the stretched material exhibits acceptable mechanical properties.

In order to prevent distortion, warping, loss of detail, or other deformation of impressed patterns, the strip material may remain in contact with the mold after flattening. For example, a portion of the strip may be wrapped around a mold roller until the strip has cooled completely or sufficiently so as to retain its shape and any impressed patterns. Pressure may be applied to the portion of the strip wrapped around the mold roller so as to force the portion of the strip against the mold roller. For example, a tensioned belt may be partially looped about the mold roller. The belt may be made of a flexible material, such as rubber. The belt may be mounted on pulleys such that the belt is free to move together with the portion of the strip with which the belt is in contact. A portion of the strip being wrapped around the mold roller may be held between the belt and the mold roller by the belt. Holding the strip against the mold roller as the strip cools may minimize or prevent distortion of the impressed patterns (for example, due to varying cooling or contraction rates).

Once the strip is sufficiently cooled, the strip may be folded, bent, or otherwise shaped using strip shaping techniques, as are known to those skilled in the art. In general, after flattening and cooling, the strip is in the form of a continuous flat strip with two edges. If necessary, edges of the strip may be trimmed so as to remove excess material or possible undulating or warped areas, or otherwise ensure a desired edge shape. Shaping the strip may include, for example, bending the strip into the form of a hose. The edges of the strip may then be bonded to one another using known techniques, for example, welding, in order to seal the wall of the hose. For example, the strip may be bent and welded such that the inward facing side of one edge adheres to the outward facing side of the opposite edge. In this case, the hose may have a circular tubular cross section. On the other hand, the strip may be bent and sealed such that the inner sides of both edges adhere to one another. In this case, the hose may have a cross section in the form of a pinched circle or oval.

Typically, a formed hose may then be coiled around a roller for storage and distribution.

As described above, one or more patterns may be impressed into the strip during the processing. For example, a pattern may be impressed into the material by a mold roller and press roller during flattening and cooling. Alternatively, a pattern or similar structure may be impressed into the strip after cooling. For example, a heated shaping element may be pressed into the strip after the strip has cooled.

Patterns that may be impressed into a material strip by a mold roller may include, for example, the form of a drip irrigation emitter. A drip irrigation emitter typically includes a labyrinth in the form of a sinuous channel. Water is typically input into one end of the labyrinth at line pressure, and is emitted from the opposite end in the form of individual drops. Typically, the form of an open-topped labyrinth may be impressed into the material at or near one edge of the strip. The open-topped labyrinth is typically shaped such that when the strip is shaped and sealed so as to form a hose, the open top of the labyrinth is closed and sealed by the opposite edge of the strip. A water inlet of the labyrinth is designed to open to the interior of the hose after sealing. A drop outlet of the labyrinth is designed to open to the exterior of the hose. Alternatively, a drop outlet of the labyrinth may be opened by a drill, punch, awl, or similar boring device, during the course of forming the strip into a hose. A boring device may be incorporated into a roller, or may be a separate component of the pipe-producing apparatus.

A continuous row of adjacent labyrinths may extend along the edge of the strip. For example, the inlet end of one labyrinth of the row may be adjacent to, and separated by a dividing structure from, the outlet end of an adjacent labyrinth. Alternatively, a row of discrete labyrinths, each separated from one another by a section of strip on which no labyrinth is impressed, may be impressed on the strip.

Other patterns may be impressed into the material strip by the mold roller. For example, a mold may be designed to form longitudinal stripes of differing thickness along the strip. For example, the thickness of a stripe of strip material along one edge of a strip may be made thinner than the remainder of the strip. For example, the thinner stripe along one edge of the strip may be designed to overlap the opposite edge of the strip when the strip is formed into a hose. By reducing the thickness of one or both of the edges, material may be conserved and the cross section of a resulting hose may have an approximately constant thickness about its perimeter.

As another example of impressed patterns, various raised patterns of material may be impressed into the strip material. The raised patterns, which may be thicker than the remainder of the strip, may provide mechanical reinforcement of the strip material. Raised patterns may include, for example, patterns of striping, crosshatching, grids, or repeating shapes, such as polygons. Alternatively or in addition, various decorative or informational labels may be impressed into the strip material. A label may include, for example, designs, lettering, or numbering. Such labels may include manufacturer information such as a company name or logo, identification of a model, lot, or product, a production date, product parameters, or orientation indication. For example, a stripe of material with a different color from the strip material may be coextruded. The stripe of different colored material may indicate a preferred orientation for laying an irrigation hose. Relevant product information may be impressed into the different colored stripe.

Alternatively or in addition, a pattern or structure may be impressed into the strip after the strip has cooled. For example, in order to produce a distribution pipe for distributing water to a plurality of irrigation pipes, the distribution pipe may be provided with a plurality of protruding ports to which irrigation pipes may connect. In order to produce such a protruding port, in accordance with some embodiments of the present invention, a heated press may be pressed into a side of a strip. For example, the heated press may be shaped as a cylinder. The heated press when pressed into a strip surface may push out a similarly shaped section of material from the strip. The section may thus be in the form of a projection projecting approximately perpendicularly from a surface of the strip. When the strip is shaped into a hose, the strip is bent such that formed projection projects outward from the walls of the hose. In general, the distal end of the formed projection is closed by a cap of material. By removing cap of material from the distal end of the projection, the projection is opened. The opened projection may serve as a protruding port to which irrigation or other branch hose may be connected using suitable connectors.

Alternatively, ports may be added to the hose at a later stage. For example, when bonding the edges of a strip to one another so as to form a hose, a hose segment may be inserted between the edges approximately perpendicularly to the axis of the hose. The inserted hose segment may serve as a protruding port to which a branch hose may be connected. Alternatively, a spacer may be inserted between the edges during adhesion. Removal of the spacer after adhesion may leave an opening in the distribution pipe into which a hose segment may be inserted and bonded. The inserted hose segment may serve as a port to which a branch hose may be connected.

Reference is now made to the accompanying Figures.

Figure 1B:
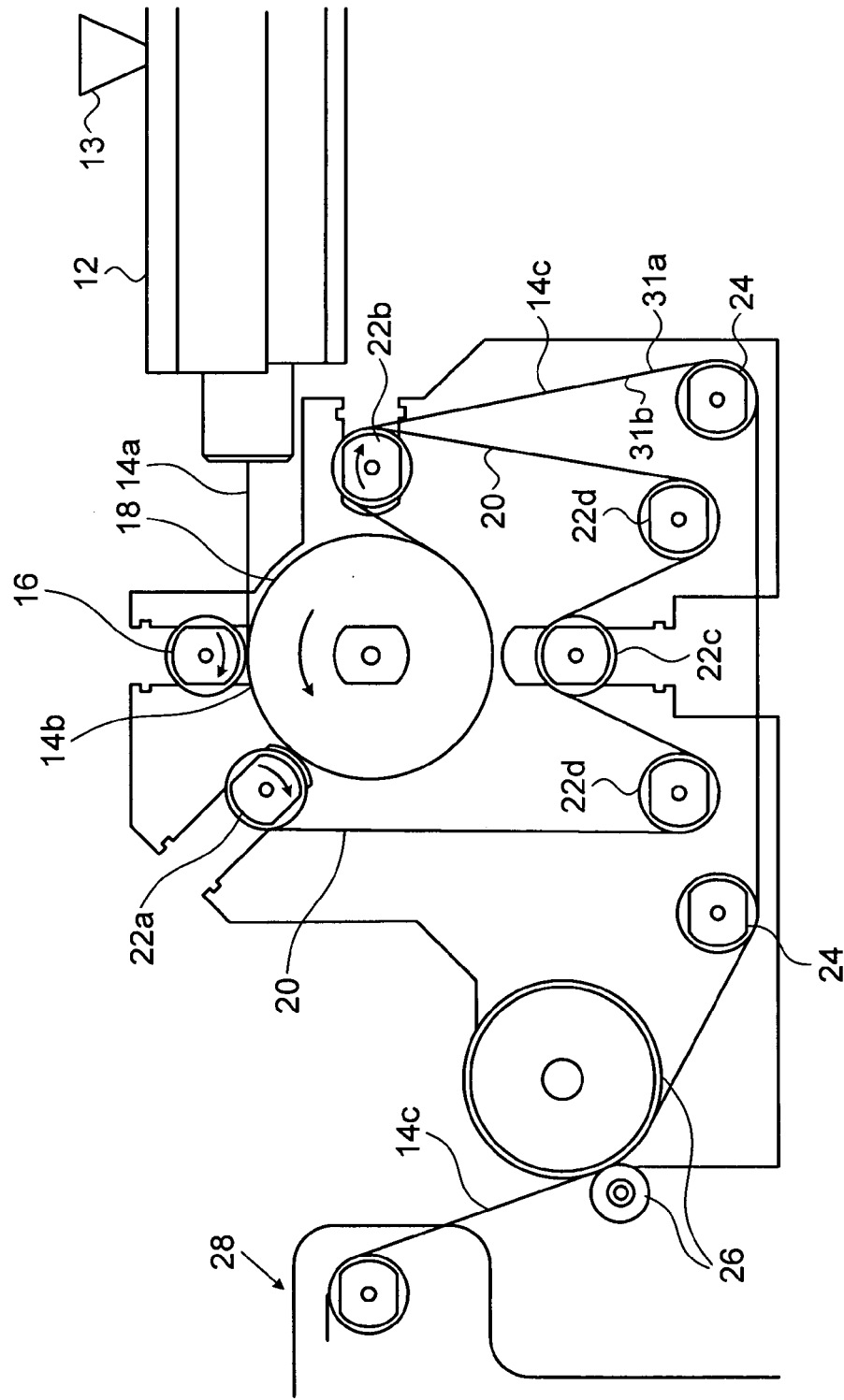
FIG. 1B is a side view of the apparatus of FIG. 1A. Raw pipe material is fed into extruder 12 from hopper 13.

FIG. 1A shows an apparatus for producing an irrigation pipe, in accordance with embodiments of the present invention. FIG. 1B is a side view of the apparatus of FIG. 1A. Raw pipe material is fed into extruder 12 from hopper 13. Extruder 12 extrudes extruded material 14a. Extruded material 14a is pulled by mold roller 18 and press roller 16. Mold roller 18 and press roller 16 flatten extruded material 14a into heated strip 14b. Mold roller 18 and press roller 16 may be each rotated by a standard motor (not shown), possibly via a transmission mechanism such as a shaft, drive belt, or gear (not shown). Mold roller 18 and press roller 16 are cooled by a cooling mechanism (not shown). The rotational velocities of mold roller 18 and press roller 16 are adjusted such that the linear velocities of their surfaces differ from one another, stretching extruded material 14a as it is flattened into heated strip 14b. The perimeter of mold roller 18 may include mold 17. By pressing extruded material 14a between mold roller 18 and press roller 16, mold 17 may impress pattern 30 into heated strip 14b. Optionally, press roller 16, or both press roller 16 and mold roller 18 may include one or more molds.

Heated strip 14b wraps around mold roller 18 as mold roller 18 continues to rotate. Rotation of mold roller 18 transports a section of heated strip 14b from press roller 16, past belt pulley 22a, and toward belt pulley 22b. As heated strip 14b is transported from belt pulley 22a to belt pulley 22b, heated strip 14b is held against mold roller 18 by belt 20. Belt 20 loops around and travels along belt pulleys 22a, 22b, 22c, and 22d. The positions of one or more of belt pulleys 22a, 22b, and 22c may be adjusted so as to adjust the tension of belt 20. The tension of belt 20 may be adjusted such as to hold heated strip 14b firmly against mold roller 18, while enabling belt 20 to travel together with heated strip 14b.

As a section of heated strip 14b is transported from belt pulley 22a to belt pulley 22b, the section of heated strip 14b cools. For example, mold roller 18, belt 20, or both, may be actively cooled by a cooling mechanism (not shown). At belt pulley 22b, cooled strip 14c separates from belt 20. Cooled strip 14c is pulled from belt pulley 22b to shaping device 28 by rollers 26 and around pulleys 24. One or both of rollers 26 may be driven by a motor with a transmission (not shown). Shaping device 28 may apply known shaping and bonding devices and techniques to shaped cooled strip 14c into a hose or other form. Shaping device 28 may also include means of coiling or winding a hose about a drum for storage and distribution.

Figure 2A:
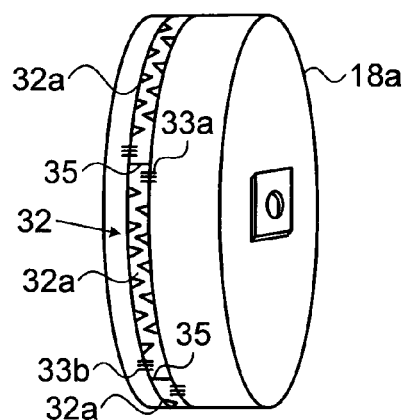
FIG. 2A shows a mold roller for impressing a continuous row of drip irrigation labyrinths, in accordance with embodiments of the present invention.

FIG. 2A shows a mold roller for impressing a continuous row of drip irrigation labyrinths, in accordance with embodiments of the present invention. Continuous labyrinth mold roller 18a includes continuous labyrinth row mold 32. Continuous labyrinth row mold 32 includes labyrinth molds 32a. Each labyrinth mold 32a may be used to impress a drip irrigation emitter labyrinth on a heated strip of extruded material. Each individual labyrinth mold 32a of continuous labyrinth row mold 32 is separated from an adjacent labyrinth mold 32a of the row by a separator structure 35. A separator structure 35 may be used to impress a separator between adjacent impressed emitter labyrinths. A separator may prevent the flow of water from one emitter to an adjacent emitter in an irrigation hose formed from the strip of extruded material. Each labyrinth mold 32a includes opening structures 33a and 33b for creating openings in an emitter labyrinth impressed on a strip of extruded material. Typically, when the strip is formed into a drip irrigation hose, one opening may function as a water inlet to the emitter labyrinth, and the other as a water outlet.

FIG. 2B shows a strip formed by the roller shown in FIG. 2A. Labyrinth row 30 is impressed on side 31a of strip 14 adjacent to edge 15b. Each labyrinth 30a of labyrinth row 30 includes an opening 37a (formed by opening structure 33a in FIG. 2A) and an opening 37b (formed by opening structure 33b). Adjacent labyrinths 30a are separated from one another by a separator 39 (formed by separator structure 35).

Strip 14 may be shaped or bent, such as by shaping device 28 (FIG. 1A). When excess material 17 is present between impressed labyrinth row 30 and edge 15b, excess material 17 may be removed prior to shaping. FIG. 2C shows a cross section of a drip irrigation hose formed by bending the strip of FIG. 2B. In this configuration, side 31b of edge 15a of strip 14 is folded onto labyrinth row 30 on side 31a of edge 15b to form drip irrigation hose 44. Side 31b of edge 15a may be welded, glued, or otherwise bonded to impressed labyrinth row 30, sealing impressed labyrinth row 30 so that it may serve as a row of drip irrigation emitters. With this configuration of drip irrigation hose 44, opening 37b (in FIG. 2B) faces the interior of drip irrigation hose 44 and may serve as a water inlet to a drip irrigation emitter. Opening 37a (FIG. 2B) faces the outside of drip irrigation hose 44 and may serve as a drip irrigation emitter outlet.

FIG. 2D shows a cross section of an alternative configuration of a drip irrigation hose formed from the strip shown in FIG. 2B. In this configuration, side 31a of edge 15a of strip 14 is folded onto labyrinth row 30 on side 31a of edge 15b to form drip irrigation hose 46. Side 31a of edge 15a may be welded, glued, or otherwise caused to bond to impressed labyrinth row 30, sealing impressed labyrinth row 30 so that it may serve as a row of drip irrigation emitters. With this configuration of drip irrigation hose 46, opening 37a (in FIG. 2B) faces the interior of drip irrigation hose 46 and may serve as a water inlet to a drip irrigation emitter. Opening 37b (FIG. 2B) faces the outside of drip irrigation hose 46 and may serve as a drip irrigation emitter outlet.

Figure 3A:
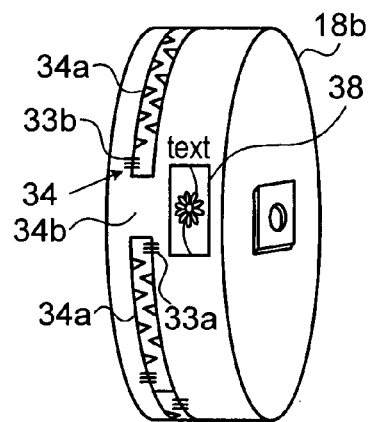
FIG. 3A shows a mold roller for impressing a row of discrete labyrinths.

Alternatively or in addition to a continuous row of labyrinths, a mold roller may impress other or additional patterns on an extruded strip of material. FIG. 3A shows a mold roller for impressing a row of discrete labyrinths. Discrete labyrinth mold roller 18b includes discrete labyrinth row mold 34. Discrete labyrinth row mold 34 includes discrete labyrinth molds 34a separated by spaces 34b. Alternatively, spaces 34b may be replaced with, or may include, a structure for impressing a water barrier. A drip irrigation hose produced from a strip with an impressed pattern formed by discrete labyrinth row mold 34 may include a row of labyrinths separated by sealed sections through which water from the interior of the hose may not escape. Discrete labyrinth mold roller 18b may also include label mold 38. It should be understood that label mold 38 is shown specifically on discrete labyrinth mold roller 18b for illustration purposes only. A label mold similar to label mold 38 may be included with any of the mold rollers shown in any of FIG. 2A or 3B-3F. Label mold 38 may include molds for impressing text or graphic designs. For example, label mold 38 may include information or a logo identifying a manufacturer or a product, or provide specifications, warnings, or other information.

Figure 3B:
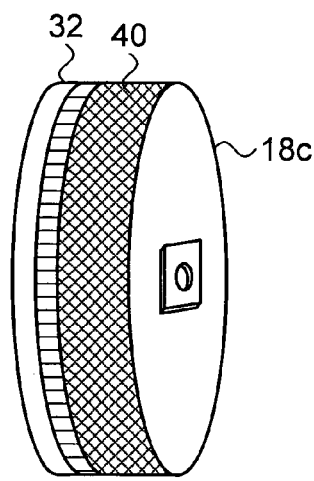
FIG. 3B shows a mold roller for impressing crosshatch pattern.
Figure 3C:
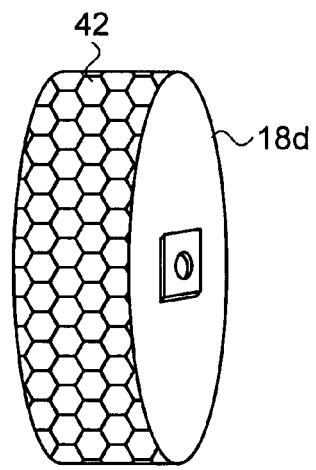
FIG. 3C shows a mold roller for impressing a hexagonal pattern.

FIG. 3B shows a mold roller for impressing crosshatch pattern. In addition to a continuous labyrinth mold 32 or other mold, crosshatch pattern mold roller 18c includes crosshatch pattern mold 40. Crosshatch pattern mold 40 is designed to impress a raised crosshatched pattern on an extruded strip of material. A raised portion of an impressed crosshatched pattern may be thicker than another portion of the strip. Thus, a raised crosshatched pattern may increase the strength of the strip and of a drip irrigation hose or other irrigation pipe made from the strip. FIG. 3C shows a mold roller for impressing a hexagonal pattern. Hexagonal pattern mold roller 18d includes hexagonal patter mold 42, in addition to any other molds, for impressing a hexagonal pattern on an extruded strip.

Figure 3F:
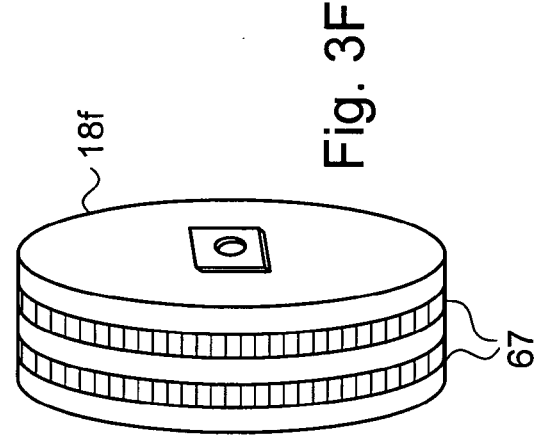
FIG. 3F shows a mold roller for impressing two rows of labyrinths on a single strip.
Figure 3G:
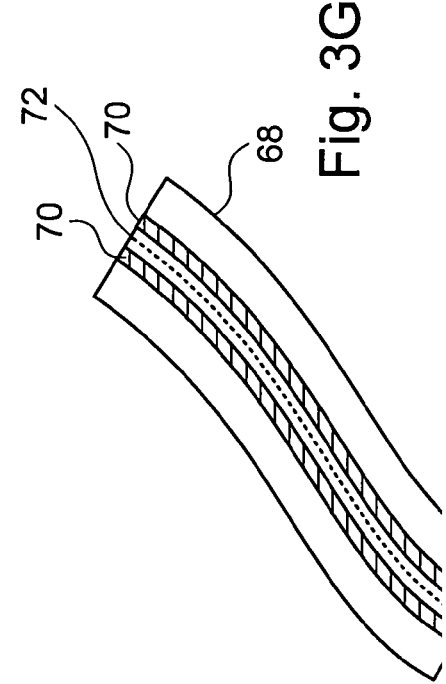
FIG. 3G shows a strip formed by the roller shown in FIG. 3F.
Figure 3D:
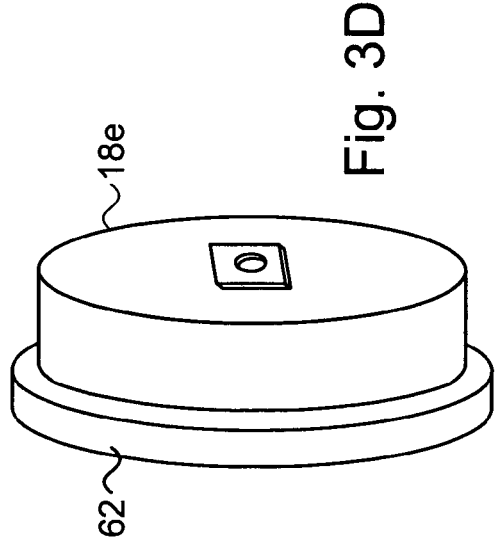
FIG. 3D shows a mold roller for impressing a thin stripe.
Figure 3E:
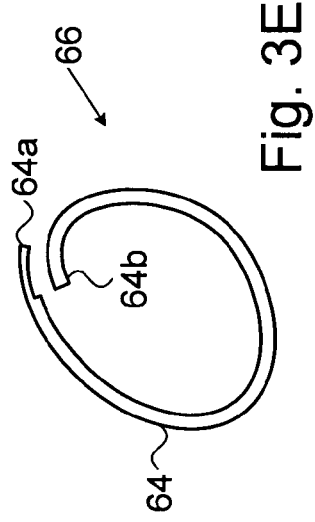
FIG. 3E shows a cross section of a pipe formed from a strip formed by the roller shown in FIG. 3D.

FIG. 3D shows a mold roller for impressing a thin stripe. FIG. 3E shows a cross section of a pipe formed from a strip formed by the roller shown in FIG. 3D. Thin stripe mold roller 18e includes raised ring 62 in addition to any other molds. Strip 64, formed by impressing with thin stripe roller 18e, includes thin edge 64a formed by raised ring 62. When shaping pipe 66 from strip 64, thin edge 64a is made to overlap edge 64b of strip 64. Thus, the overlap of thin edge 64a and edge 64b may not cause a region of unduly increased thickness in the walls of pipe 66. In addition, a roller may be designed, for example, with a sloped surface, such as to cause the thickness of strip 64 to decreasing in a tapering fashion, near edge 64b.

Alternatively, a mold roller may be designed to impress two or more rows of labyrinths, or another pattern, on a single extruded strip. The strip with multiple rows of patterns may then be sliced between the rows into two or more narrow strips. Each narrow strip may be separately shaped into a drip irrigation hose or other irrigation pipe. Thus, multiple irrigation pipes may be formed in parallel. FIG. 3F shows a mold roller for impressing two rows of labyrinths on a single strip. FIG. 3G shows a strip formed by the roller shown in FIG. 3F. Double row mold roller 18f includes two labyrinth row molds 67. A strip 68 formed by double row mold roller 18f includes two rows 70 of labyrinths. Strip 38 may be cut along a line between rows 70, for example along line 72. When strip 38 is cut along line 72, two separate strips are formed, each including a row 70 of labyrinths. If necessary, any excess material adjacent to line 72 may be trimmed. A separate irrigation pipe may be formed from each separate narrow strip. Similarly, more than two parallel rows of labyrinths may be formed on a single wide strip, with appropriate cutting and trimming operations used to make multiple strips.

Figure 4A:
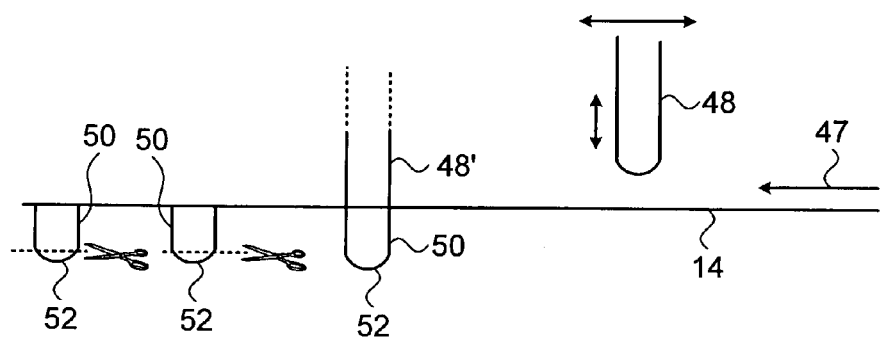
FIG. 4A schematically illustrates formation of a protruding port for a distribution pipe.

In accordance with some embodiments of the present invention, a form may be impressed at on strip by elements other than, or in addition to, a mold roller. For example, a heated press may be pressed into a strip after the strip has cooled. The heated press may then cause a section of the strip to extend out of the strip in the approximate shape of the form. FIG. 4A schematically illustrates formation of a protruding port for a distribution pipe. Strip 14, which may be cool, is being transported in the direction indicated by arrow 47. Press 48 is in the approximate shape of a protruding port to be pressed into strip 14. Press 48 may be heated in order to facilitate pressing into a cooled strip. In order form a projection in the shape of press 48, press 48 is moved toward and pressed into strip 14, to form position 48'. In addition to the motion toward and into strip 14, press 48 may be moved parallel to, and at the same velocity as, the transport of strip 14 in the direction of arrow 47. For example, when press 48 is in contact with strip 14, the parallel motion of press 48 in the direction of arrow 47 may prevent press 48 from tearing, distorting, or otherwise damaging strip 14.

Pressing press 48 into strip 14 causes protruding projection 50 of strip material to protrude approximately perpendicular to the plane of strip 14. After forming protruding projection 50, press 48 may be retracted away from strip 14. Typically, the distal end of protruding projection 50 is at least partially covered with a cap 52 of material. Cap 52 at the distal end of protruding projection 50 may be then be cut off or otherwise removed, in order to form protruding projection 50 into a protruding port through which fluid may flow.

Figure 4B:
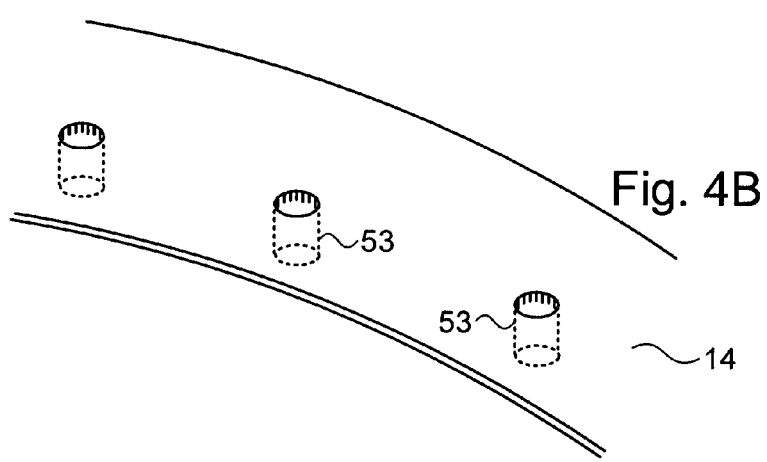
FIG. 4B shows a strip formed as illustrated in FIG. 4A.
Figure 4C:
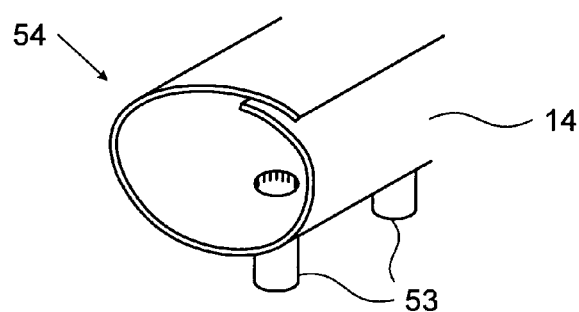
FIG. 4C shows formation of a distribution pipe from the strip shown in FIG. 4B.

FIG. 4B shows a strip formed as illustrated in FIG. 4A. Strip 14 includes formed protruding ports 53. FIG. 4C shows formation of a distribution pipe from the strip shown in FIG. 4B. Strip 14 is bent so as to form distribution pipe 54 with protruding ports 53 facing outward. An irrigation hose, branch hose, or other connected pipe or tube may be connected to each protruding port 53 of distribution pipe 53.

Figure 5A:
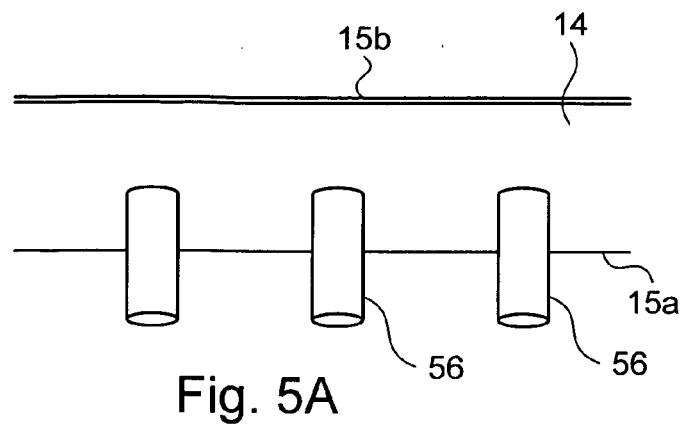
FIG. 5A illustrates preparation of a material strip for formation of a distribution pipe with inserted tubes.
Figure 5B:
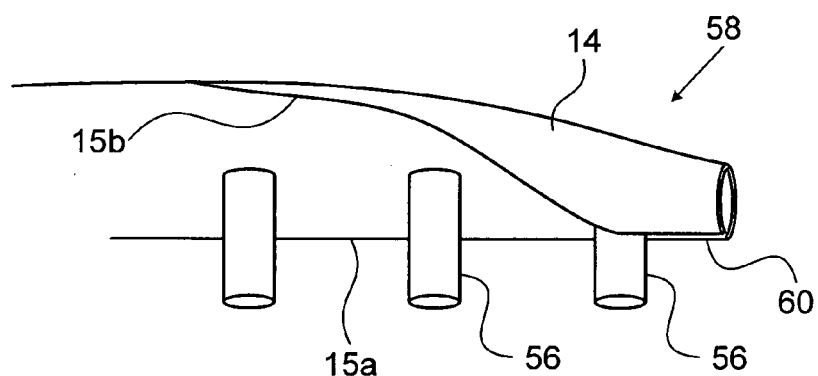
FIG. 5B illustrates formation of a distribution pipe from the material strip shown in FIG. 5A.

Alternatively, a protruding port or connector may be formed by a separate extrusion, molding, or other process. Typically, such a separately formed port may be in the form of a tube segment. The separately formed tube segment may then be inserted into and bonded to the wall of distribution pipe shaped from a strip of material formed in accordance with embodiments of the present invention. The inserted tube segment may form a protruding port to which a hose may be connected. FIG. 5A illustrates preparation of a material strip for formation of a distribution pipe with inserted tubes. FIG. 5B illustrates formation of a distribution pipe from the material strip shown in FIG. 5A. Tubes 56 are initially distributed along, and placed approximately perpendicular to, edge 15*a* of strip 14. Strip 14 is shaped into distribution pipe 58 by bending edge 15*b* toward edge 15*a*. Edge 15*b* is welded, or otherwise bonded to, edge 15*a* so as to form seam 60. Tubes 56 extend from seam 60. A welding or other bonding process may bond tubes 56 to seam 60. In this case, each tube 56 may serve as a port or connector to which a drip irrigation hose, branch hose, or other irrigation pipe may be connected.

Alternatively, tubes 56 may be not be bonded to seam 60. For example, tubes 56 may be made of, or may be coated with, a material that does not weld or otherwise adhere to the material of strip 14. For example, a tube with a metal surface may not weld to a plastic strip material. In this case, a tube 56 may be removed from seam 60 after seam 60 is sealed. Removal of tube 56 may then create an opening in seam 60. A tube segment may then be inserted into the opening, and welded or otherwise bonded to seam 60.

Figure 5C:
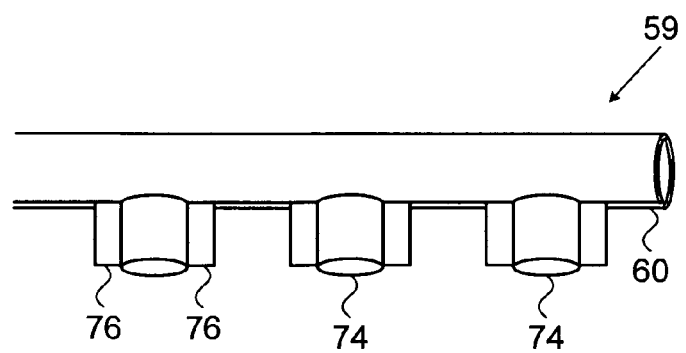
FIG. 5C shows a distribution pipe with winged inserted tube segments.

In order to better adhere to seam 60 or to an opening in seam 60, a tube segment may be formed with approximately coplanar wing extensions. FIG. 5C shows a distribution pipe with winged inserted tube segments. Each winged tube segment 74 includes two approximately coplanar wings 76 extending from opposite sides of winged tube segment 74. In order to form distribution pipe 59, a winged tube segment 74 is positioned in seam 60 such that wings 76 align with, and extend along, seam 60. A winged tube segment 74 may better conform to a typical shape of an opening in seam 60 than a tube segment without wings. Therefore, the addition of wings 76 may enable improving the bond with seam 60. Improvement of the bond with seam 60 may also contribute to an increase in the effectiveness of the seal of seam 60. For example, distribution pipe 59 may be formed similarly to distribution pipe 58 in FIG. 5B, with each tube 56 of FIG. 5B replaced with a winged connector tube 74. Alternatively, a winged connector tube 74 may be inserted into, and welded or otherwise bonded to, an opening created in seam 60.

Figure 6:
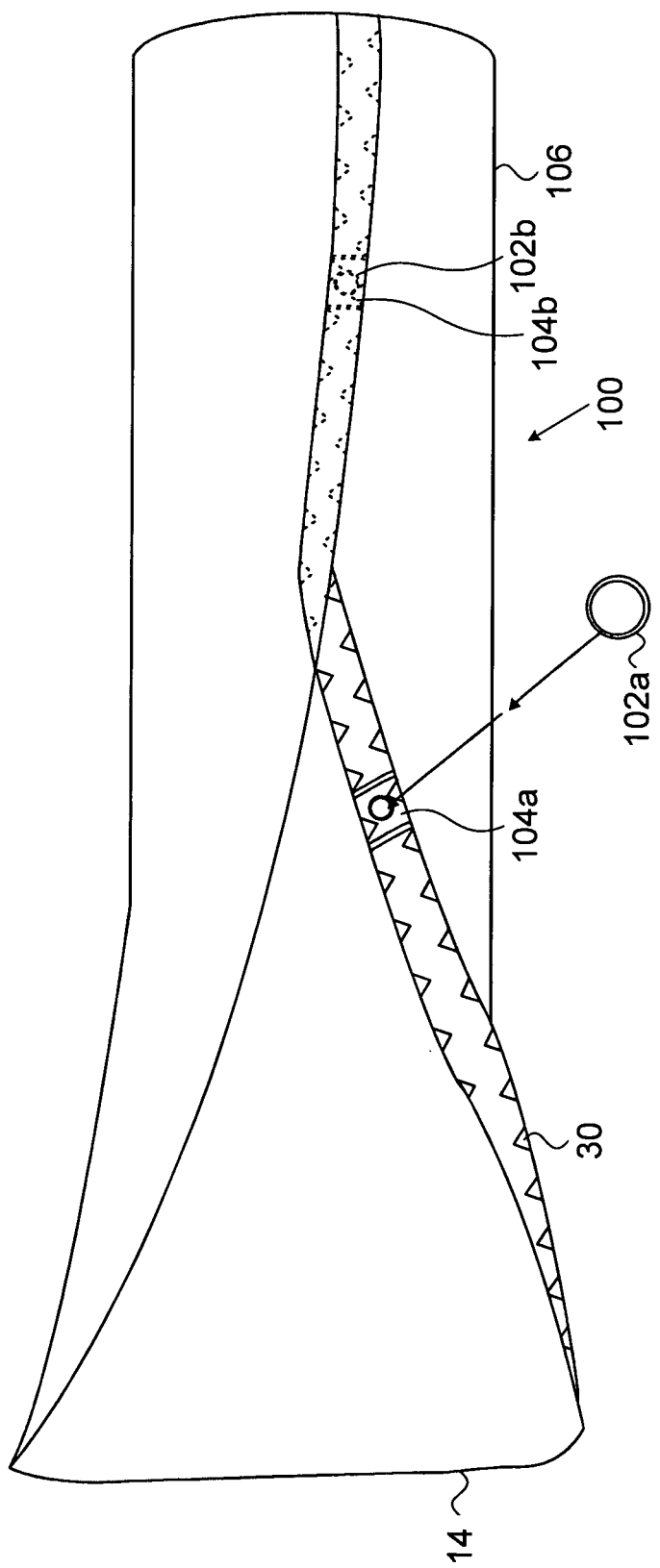
FIG. 6 illustrates construction of an irrigation pipe that incorporates a seed, in accordance with embodiments of the present invention.

An irrigation pipe produced in accordance with embodiments of the present invention may incorporate a seed. For example, a seed may be positioned near a drip irrigation emitter outlet of a labyrinth of the irrigation pipe. Positioning the seed near the drip irrigation emitter outlet may ensure that when the irrigation pipe is installed and operated, the seed or a plant growing from the seed is optimally positioned to receive irrigation. FIG. 6 illustrates construction of an irrigation pipe that incorporates a seed, in accordance with embodiments of the present invention. A strip 14 may include a molded seed compartment 104*a*. A seed compartment 104*a* may be incorporated into labyrinth row 30 at substantially regular intervals. For example, a seed compartment 104*a* may be positioned adjacent to each labyrinth of labyrinth row 30. A seed 102*a* may be inserted into seed compartment 104*a*. When strip 14 is bent and bonded to form irrigation pipe 106, a seed 102*b* may be enclosed within closed seed compartment 104*b*.

When irrigation pipe 106 is installed and operated, seed 102*b* may be irrigated. For example, closed seed compartment 104*b* may include one or more openings that enable water flowing through irrigation pipe 106 or labyrinth row 30 to enter closed seed compartment 104*b*. Alternatively, closed seed compartment 104*b* may include an opening to the exterior of irrigation pipe 106. Water emitted by a drip irrigation emitter outlet of labyrinth row 30 may moisten enclosed seed 102*b*. An opening from closed seed compartment 104*b* to the exterior of irrigation pipe 106 may also ensure that when enclosed seed 102*b* sprouts, roots and other growth are directed toward the exterior of irrigation pipe 106.

Alternatively, a seed may be otherwise attached to an irrigation pipe. For example, a seed may be taped, glued, stapled, or otherwise affixed to an exterior surface of the irrigation pipe. Each affixed seed may be positioned near a drip irrigation emitter outlet of the irrigation pipe.

Figure 7:
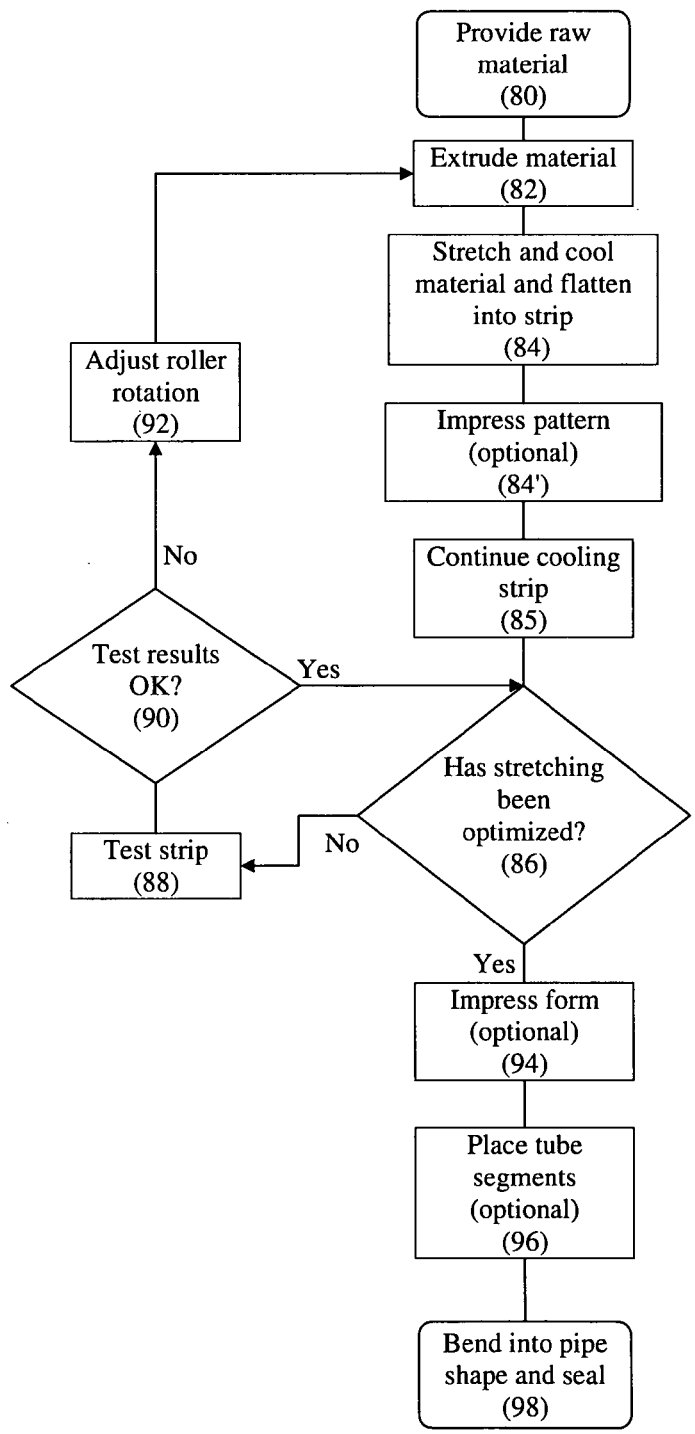
FIG. 7 shows a flow chart of a method for producing an irrigation pipe, in accordance with embodiments of the present invention.

A method for producing an irrigation pipe, in accordance with embodiments of the present invention, includes extruding pipe material; stretching, flattening and possibly impressing a pattern on the extruded material; and shaping the flattened material into an irrigation pipe. FIG. 7 shows a flow chart of a method for producing an irrigation pipe, in accordance with embodiments of the present invention.

One or more raw material components are loaded into one or more hoppers of an extruder (step 80). The extruder processes the raw material and extrudes a continuous length of heated pipe material in an initial form (step 82). The initial form may be that of a cylindrical pencil or a flattened ribbon of material. Several lengths of the same or different materials may be coextruded concurrently. The heated material is then passed through a system of rollers. The rollers may concurrently stretch, cool, and flatten the material into a strip (step 84), and a mold on one or more rollers may optionally impress one or more patterns on the strip (step 84'). Alternatively, the operations of stretching, flattening, and impressing may be performed by separate rollers of the system. Cooling of the strip continues, possibly while the strip remains pressed against a mold (step 85).

It may be necessary to perform an optimization of the roller rotation of the various rollers in the roller system so as to optimize the stretching of the material (step 86). For example, optimization may be necessary when beginning to produce a new type of irrigation pipe, or when one or more parameters have changed. Such parameters may include the composition of the extruded material, dimensions of the extruded length of material, and the patterns that are impressed into the material.

Typically, optimization may include testing the properties of a sample length of the strip (step 88). Tested properties may include the tensile strength and other mechanical strength properties of the sample, such as, for example, resistance to puncturing, tearing, or cracking. If the strip tests show that the tested strip is acceptable (step 90), the production process may be allowed to continue. If not, the rotation of the rollers may be adjusted (step 92). For example, the rotational velocity of one or more rollers may be adjusted in order to optimize the stretching of the material. Other properties, such as the separation distance between rollers, may also be adjusted. The optimization procedure (steps 88-92) may be repeated until an optimum configuration is attained (step 86).

When required, projections or other structure may be formed on the cooled strip, for example, by pressing one or more heated presses into the strip (step 94). The structure may be further modified by other procedures, for example, cutting a cap of a distal end of the structure. The strip may then be fashioned into an irrigation pipe of a desired form. When necessary, tube segments or spacers of appropriate form may be positioned along edges of the strip that are to be connected so as to form a seam (step 96). The strip may then be bent or otherwise shaped into an appropriate shape, such as, for example, a drip irrigation hose or a distribution pipe. Edges of the bent strip may be welded or otherwise affixed to one another so as to form a sealed seam (step 98). Sealing the seam may form one or more drip irrigation emitters from appropriate impressed patterns. When necessary, any tube segments may be welded or otherwise affixed to the seam. Also when necessary, spacers may be removed from the seam and replaced with appropriate tube segments, nozzles, or nipples, which may be affixed to the seam. A completed hose or other irrigation pipe may be coiled around an appropriate drum, or otherwise placed in an appropriate storage configuration.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for forming extruded plastic material into a strip that may be formed into an irrigation pipe, the method comprising:
   providing a pair of juxtaposed rollers, a roller of the pair of rollers including a mold of a pattern; and
   cooling the pair of juxtaposed rollers while passing the extruded plastic material between the pair of juxtaposed rollers and while maintaining the linear velocity of a contact surface of one of the rollers of the pair of rollers different from the linear velocity of a contact surface of the other roller of the pair of rollers, such that the extruded material that passes between the rollers is concurrently stretched and pressed between the pair of rollers so as to flatten the extruded material as the extruded material is concurrently cooled by the rollers and as the pattern is concurrently impressed on the extruded material so as to produce a strip with an undistorted pattern that is suitable for formation into the irrigation pipe.

2. A method as claimed in claim 1, comprising adjusting the linear velocity of at least one of the rollers.

3. A method as claimed in claim 1, comprising holding the flattened material against a roller of the pair of rollers as the roller rotates using a belt.

4. A method as claimed in claim 1, comprising pressing into the strip so as to form a projection that protrudes from the strip.

5. A method as claimed in claim 1, comprising shaping the strip into a hose.

6. A method as claimed in claim 5, comprising inserting tubes perpendicularly while shaping the strip into a hose, so as to form a distribution pipe.

7. A method as claimed in claim 6, comprising providing the tubes with wings.

8. A method as claimed in claim 5, comprising inserting a seed while shaping the strip into a hose.

\* \* \* \* \*